Aug. 24, 1943.  C. F. TERHUNE  2,327,613
CENTRIFUGAL SEPARATOR
Filed Oct. 13, 1942    3 Sheets-Sheet 3
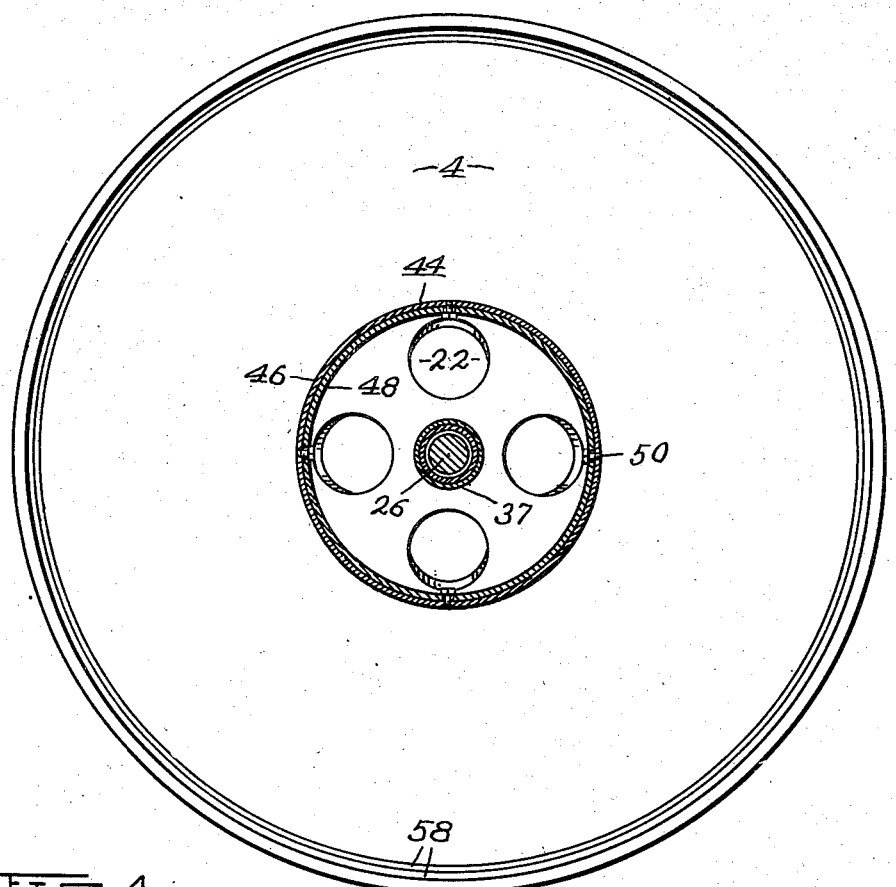
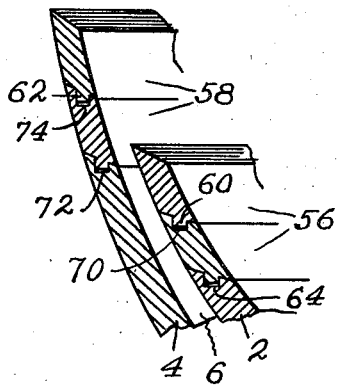
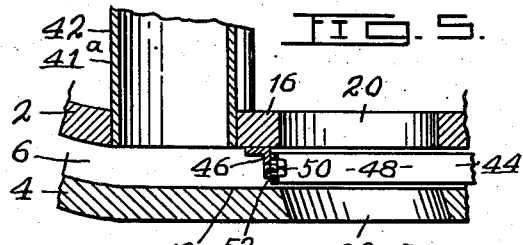
Inventor:
Cornelius F. Terhune,
By F. G. Fischer,
Attorney Patented Aug. 24, 1943

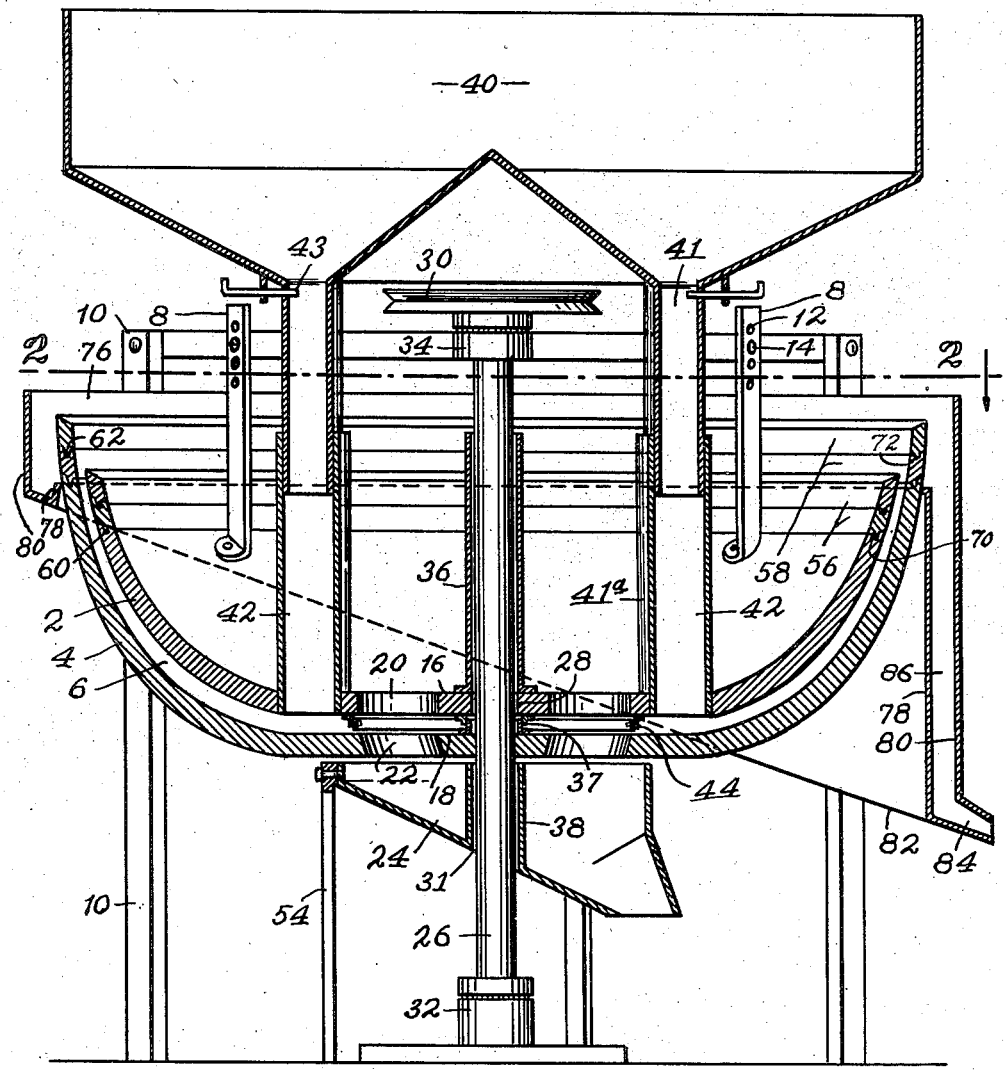

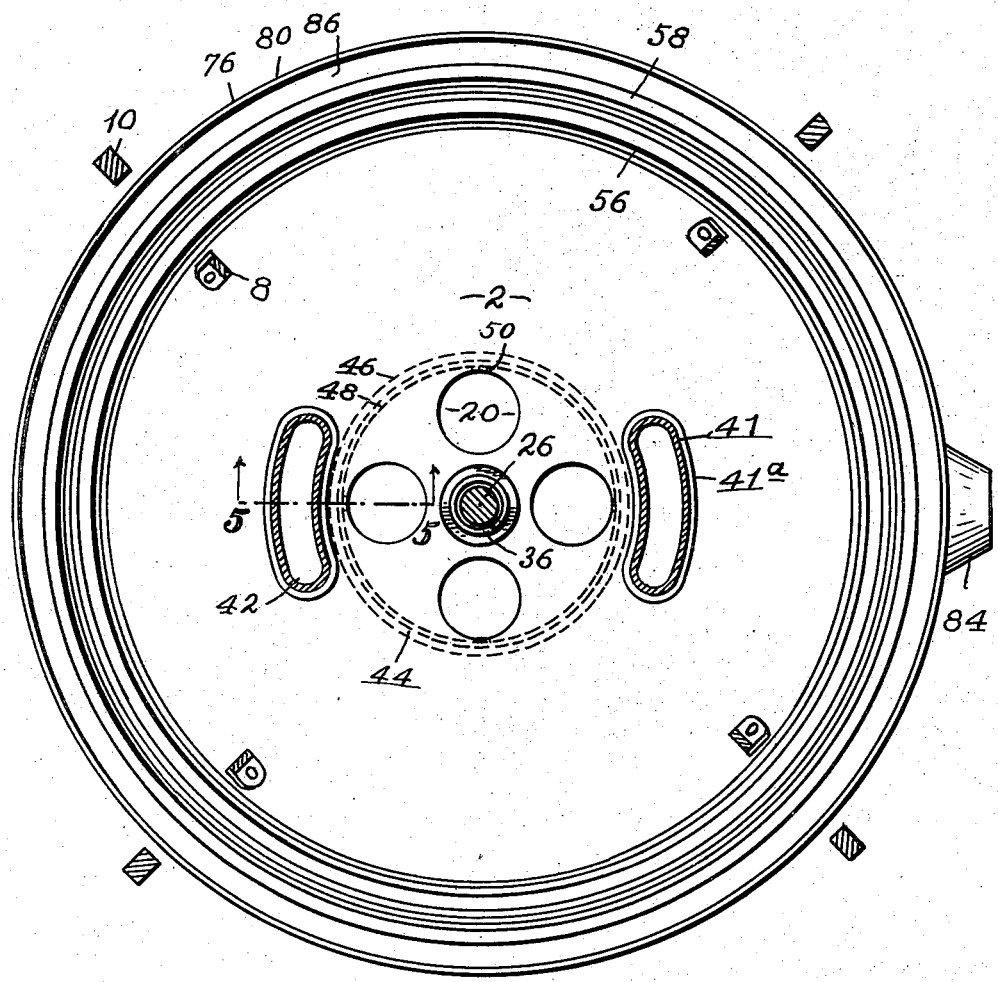

2,327,613

UNITED STATES PATENT OFFICE 2,327,613

CENTRIFUGAL SEPARATOR

Cornelius F. Terhune, Kansas City, Mo.

Application October 13, 1942, Serial No. 461,846

11 Claims. (Cl. 233—27)

My invention relates to centrifugal separators and an object of the invention is the provision of apparatus for separating intermixed divided materials of the same or different specific gravities and the same or different sizes. The materials acted upon may be of like character or they may comprise two or more different kinds of materials. The separations are preferably made with the materials in a dry state, but if desired a wet process employing water may be used when separating certain kinds of materials, such, for example, as different metals or metallic substances contained in various grades of ores.

A further object of the invention is the provision of a separator in which centrifugal force, and to a lesser extent friction and the action of gravity are utilized in effecting separation of the materials.

A further object is the provision of a separator which can be operated continuously, effectively, and economically, and in order that the invention may be fully understood reference will now be had to the accompanying drawings, in which:

Fig. 1 is a vertical central section of the apparatus.

Fig. 2 is a horizontal section on line 2—2 of Fig. 1.

Fig. 3 is a plan view of an outer bowl with some of the associated parts in section.

Fig. 4 is an enlarged fragmentary section of the upper portions of the outer bowl and an inner bowl with supplemental rings.

Fig. 5 is an enlarged fragmentary section on line 5—5 of Fig. 2.

Referring in detail to the different parts, 2 and 4 indicate an inner bowl and an outer bowl, respectively, arranged concentrically with each other. The bowls are so proportioned and arranged as to leave an intervening space 6 for reception of the materials to be separated.

The respective inner and outer bowls 2 and 4 are so proportioned as to cause the intervening space 6 to taper upward toward the rim of the inner bowl 2, an arrangement which gives the flat lower portion of the intervening space capacity for enough materials to spread uniformly over the entire inner surface of the outer bowl 4 when such materials are subjected to the action of centrifugal force. The foregoing arrangement also has the advantage of locating the rim of the inner bowl 2 close enough to the inner surface of the outer bowl 4 for the lighter material to fall into the inner bowl and thus become completely separated from the heavier material which is carried over the rim of the outer bowl by centrifugal force as will hereinafter appear.

The inner bowl 2 is preferably of less depth than the outer bowl 4 so that the rim of the latter will extend above the rim of the former and said inner bowl is adjustably supported by suitable means such as hangers 8, so that it may be raised or lowered to vary the capacity of the intervening space 6. The hangers 8 are suitably secured at their lower ends to the inner bowl 2 and adjustably connected at their upper ends in any appropriate manner to a frame 10, such adjustment, in the present instance, being effected by holes 12 in the hangers and pins or bolts 14 adapted to pass through the holes and removably engage the frame 10. The inner and outer bowls 2 and 4 have flat bottoms 16 and 18 with outlets 20 and 22, respectively, through which some of the separated materials are discharged into an underlying chute 24.

The inner bowl 2 remains stationary during operation of the apparatus, while the outer bowl 4 is rotated by a centrally disposed vertical drive shaft 26 upon which the outer bowl 4 is fixed. The shaft 26 extends freely through a central opening 28 in the bottom of the inner bowl 2 and is provided at its upper end with suitable driving means comprising in the present instance a pulley 30. The drive shaft 26 also extends freely through an opening 31 in the bottom of the chute 34 and is journaled in lower and upper bearings 32 and 34, respectively, the former of which is located beneath the chute 24, while the latter may be appropriately connected to the upper portion of the frame 10. Tubular shields 36, 37 and 38 in the bowl 2, the intervening space 6 and the chute 24, respectively, surround and protect the rotary shaft 26 from abrasion by preventing the materials from coming into contact therewith.

Materials to be separated are fed into the intervening space 6 between the bowls 2 and 4, through a hopper 40 provided with a suitable number of down-spouts 42. The down-spouts 42 are telescopic to permit vertical adjustments of the inner bowl 2, and comprise upper and lower tubular sections 41 and 41a, secured to the bottom of the hopper 40 and the inner bowl 2, respectively, as shown by Fig. 1. The lower ends of the sections 41a are secured in holes extending through the bottom of the inner bowl 2, so that said sections 41a will move with the bowl when the latter is adjusted vertically. Passage of the materials through the down-spouts 42 may be controlled in any suitable manner, slide valves 43 being shown in the present instance for that purpose. The incoming materials are prevented from becoming intermixed with the separated outgoing material passing through the outlets 20 and 22, by a baffle 44 spaced between said outlets and the lower ends of the spouts 42, Figs. 1, 2 and 5.

The baffle 44 preferably comprises two rings 46 and 48, the former of which is secured to the bottom of the inner bowl 2, while the ring 48 extends downward into close proximity with the bottom of the outer bowl 4. The ring 48 is telescopically arranged within the ring 46 so that the baffle may be extended or contracted when the inner bowl 2 is adjusted upward or downward to vary the capacity of the intervening space 6, as hereinbefore stated. The ring 48 is adjustably secured to the ring 46 by screws 50 which are threaded in the latter and pass through vertical slots 52 in the former. Access may be had to the screws 50 through the outlets 22 after the chute 24 has been disengaged from supports 54 and lowered.

In order that the capacity of the bowls 2 and 4 may be increased I provide any desired number of supplemental rings 56 and 58 which may be added to the upper portions of the respective bowls. The rings 56 and 58 are removably held in place by appropriate means, such as studs 60 and 62, respectively. The studs 60 of the lower ring 56 are adapted to enter recesses 64 in the upper margin of the inner bowl 2, while the studs on the upper ring 56 are adapted to enter recesses 70 in the upper margin of the lower ring. The same arrangement applies to the studs 62, those on the lower ring 58 being adapted to enter recesses 72 in the upper margin of the outer bowl 4, while the studs on the upper ring are adapted to enter recesses 74 in the upper margin of the lower ring 58.

The rings 58 and the upper portion of the outer bowl 4 are surrounded by a funnel 76 for catching that part of the separated material which passes over the rim of the bowl, or the supplemental rings 58 when applied to said bowl. The funnel 76 comprises respective inner and outer annular walls 78, 80, and an inclined bottom 82 terminating at their lowermost portions in a discharge spout 84. The walls 78 and 80 are spaced apart and in conjunction with the inclined bottom 82 provide an intervening chamber 86 to receive and discharge the material from the outer bowl 4.

In practice, rotary motion is imparted to the outer bowl 4 by the drive shaft 26, while the materials to be separated are fed into the hopper 40 and conducted by the down-spouts 42 to the intervening space 6 where it is acted upon by centrifugal force which, in cooperation with the respective upwardly curved adjacent surfaces of the inner and outer bowls 2 and 4, carries the materials upward and distributes them uniformly throughout the space 6. During the upward movement of the heavier material it is separated from the lighter material by the action of centrifugal force, friction and gravity, the heavier material being forced against the adjacent surface of the rotary outer bowl 4 and the lighter being crowded against the adjacent surface of the stationary inner bowl 2, so that on reaching the rim of said inner bowl 2, or the topmost supplemental ring 56, the lighter material will fall into the inner bowl 2, while the heavier material continues to ascend until thrown outward over the rim of the outer bowl 4, or the uppermost supplemental ring 58. After falling into the inner bowl 2, the lighter material descends and escapes through the outlets 20 and 22 to the chute 24, while the heavier material falls into and is discharged from the funnel 76. As the separated materials are automatically discharged from the apparatus it is apparent that loss of time and production need not occur for removal of such materials, since it will not be necessary to shut down the apparatus for that purpose.

From the foregoing description taken in connection with the drawings, it is apparent that I have provided an efficient apparatus which is well adapted for the purpose intended and while I have shown one form of the apparatus I reserve all rights to such changes and modifications thereof as properly fall within the scope of the invention as claimed.

Having thus described my invention, what I claim and desire to secure by Letters Patent, is:

1. In a centrifugal separator, the combination of an outer bowl, an inner bowl located within said outer bowl, and proportioned to leave an intervening space between it and the outer bowl for reception of materials to be separated, means for holding the inner bowl stationary, and means for rotating the outer bowl to effect separation of the materials which are carried upward by centrifugal force, the lighter material passing upward and inward over the rim of the inner bowl, and the heavier material passing upward and outward over the rim of the outer bowl which extends above the rim of said inner bowl.

2. In a centrifugal separator, the combination of an outer bowl having an outlet in its bottom, an inner bowl located within said outer bowl and provided with an outlet in its bottom, said inner bowl being proportioned to leave an intervening space between it and the outer bowl for reception of materials to be separated, means through which materials of different weights are fed into the lower portion of the intervening space between the bowls, means for rotating the outer bowl to effect separation of the materials which are carried upward by centrifugal force, the lighter material passing upward and inward over the rim of the inner bowl and escaping through the outlets in the bottoms of both bowls, and the heavier material passing upward and outward over the rim of the outer bowl which extends above the rim of said inner bowl, and means located in the intervening space and so arranged with respect to the outlets as to prevent the incoming materials from intermixing with the material passing through said outlets.

3. In a centrifugal separator, the combination of an outer bowl provided at its upper margin with spaced recesses, an inner bowl located within said outer bowl and provided at its upper margin with spaced recesses, said inner bowl being proportioned to leave an intervening space between it and the outer bowl for reception of materials to be separated, means for rotating the outer bowl, supplemental rings removably mounted upon the upper portions of the respective bowls, and studs depending from the lower margins of said rings and adapted to enter the respective recesses.

4. In a centrifugal separator, the combination of an outer bowl, a stationary inner bowl located within said outer bowl, and proportioned to leave an intervening space between it and the outer bowl for reception of materials to be separated, means for rotating the outer bowl to effect separation of the materials which are carried upward by centrifugal force, the lighter material passing upward and inward over the rim of the inner bowl, and the heavier material passing upward and outward over the rim of the outer bowl which extends above the rim of the inner bowl, and a funnel surrounding the upper portion of the outer bowl and provided with an annular chamber to receive the material passing outward over the rim of the bowl, said funnel having an inclined bottom and a discharge spout at the lower portion of the chamber.

5. In a centrifugal separator, the combination of an outer bowl having an outlet in its bottom, an inner bowl located within said outer bowl and provided with an outlet in its bottom, said inner bowl being proportioned to leave an upwardly tapered intervening space between it and the outer bowl for reception of materials to be separated, means through which materials of different weights are fed into the lower portion of the intervening space between the bowls, means for rotating the outer bowl to effect separation of the materials which are carried upward by centrifugal force, the lighter material passing upward and inward over the rim of the inner bowl and escaping through the outlets in the bottoms of both bowls, the heavier material passing upward and outward over the rim of the outer bowl which extends above the rim of the inner bowl, and annular means located in the intervening space for preventing the incoming materials from becoming mixed with the outgoing material discharged through the outlets in the bottoms of the bowls.

6. In a centrifugal separator, the combination of an outer bowl having an outlet in its bottom, an inner bowl located within said outer bowl and provided with an outlet in its bottom, said inner bowl being proportioned to leave an upwardly tapered intervening space between it and the outer bowl for reception of materials to be separated, means through which materials of different weights are fed into the lower portion of the intervening space between the bowls, means for rotating the outer bowl to effect separation of the materials which are carried upward by centrifugal force, the lighter material passing upward and inward over the rim of the inner bowl and escaping through the outlets in the bottoms of both bowls, the heavier material passing upward and outward over the rim of the outer bowl which extends above the rim of the inner bowl, and an annular baffle secured to the bottom of the inner bowl and located in the intervening space for preventing the incoming materials from becoming mixed with the outgoing material discharged through the outlets in the bottoms of the bowls.

7. In a centrifugal separator, the combination of an outer bowl having an outlet in its bottom, an inner bowl located within said outer bowl and provided with an outlet in its bottom, said inner bowl being proportioned to leave an intervening space between it and the outer bowl for reception of materials to be separated, means through which materials of different weights are fed into the lower portion of the intervening space between the bowls, means for rotating the outer bowl to effect separation of the materials which are carried upward by centrifugal force, the lighter material passing upward and inward over the rim of the inner bowl and escaping through the outlets in the bottoms of both bowls, the heavier material passing upward and outward over the rim of the outer bowl which extends above the rim of said inner bowl, circular means in the intervening space so arranged with respect to the outlets as to prevent the incoming materials from becoming intermixed with the material passing through said outlets, and a chute arranged beneath the outlets in the bottoms of the bowls.

8. In a centrifugal separator, the combination of an outer bowl, an inner bowl located within said outer bowl, and proportioned to leave an intervening space between it and the outer bowl for reception of materials to be separated, a vertical drive shaft extending freely through a central opening in the bottom of the inner bowl and fixed to the central bottom portion of the outer bowl, bearings for said shaft located respectively above and below the bowls, and tubular shields surrounding said drive shaft and located respectively in the inner bowl and the intervening space between the bowls, the interior of said shields being of greater cross section than the shaft to leave respective intervening spaces and thereby prevent frictional engagement with the shaft.

9. In a centrifugal separator, the combination of an outer bowl having an outlet in its bottom, an inner bowl located within said outer bowl and having an outlet in its bottom, said inner bowl being proportioned to leave an intervening space between it and the outer bowl for reception of materials to be separated, means for preventing the materials in the intervening space from passing directly to said outlets, a discharge chute located beneath the outlets in the bowls, a vertical drive shaft extending freely through openings in the inner bowl and the discharge chute and fixed centrally to the bottom of the outer bowl, and shields in the inner bowl, the intervening space and the discharge chute for protection of the drive shaft.

10. In a centrifugal separator, the combination of an outer bowl having an outlet in its bottom, an inner bowl located within said outer bowl having an outlet in its bottom, said inner bowl being proportioned to leave an intervening space between it and the outer bowl for reception of materials to be separated, means for rotating the outer bowl, means for adjusting the inner bowl vertically to vary the capacity of the intervening space, an inlet in the inner bowl through which materials to be separated are fed, and a telescopic baffle located in the intervening space and arranged between the inlet and the outlets, comprising a first ring secured to the bottom of the inner bowl, a second ring adapted to be adjusted vertically, and means for securing said second ring to the first ring.

11. In a centrifugal separator, the combination of an outer bowl, an inner bowl located in said outer bowl and proportioned to leave an intervening space between said bowls, means for adjusting the inner bowl vertically to vary the capacity of said intervening space, a hopper spaced above the bowls, and telescopic downspouts leading from the hopper to said intervening space, one section of each down-spout being connected to the hopper and another section being connected to the inner bowl to effect automatic and simultaneous adjustment with said inner bowl.

CORNELIUS F. TERHUNE.